United States Patent
Mao

(10) Patent No.: US 11,135,659 B2
(45) Date of Patent: Oct. 5, 2021

(54) CUTTING TOOL HOLDER, CUTTING TOOL, AND METHOD OF MANUFACTURING MACHINED PRODUCT

(71) Applicant: Kyocera Corporation, Kyoto (JP)

(72) Inventor: Shouhei Mao, Yasu (JP)

(73) Assignee: KYOCERA Corporation, Kyoto (JP)

(*) Notice: Subject to any disclaimer, the term of this patent is extended or adjusted under 35 U.S.C. 154(b) by 0 days.

(21) Appl. No.: 15/771,406

(22) PCT Filed: Oct. 27, 2016

(86) PCT No.: PCT/JP2016/081877
§ 371 (c)(1),
(2) Date: Apr. 27, 2018

(87) PCT Pub. No.: WO2017/073663
PCT Pub. Date: May 4, 2017

(65) Prior Publication Data
US 2018/0339348 A1   Nov. 29, 2018

(30) Foreign Application Priority Data
Oct. 28, 2015 (JP) .............................. JP2015-211394

(51) Int. Cl.
*B23B 51/04*  (2006.01)

(52) U.S. Cl.
CPC .... *B23B 51/048* (2013.01); *B23B 2200/0476* (2013.01); *B23B 2200/083* (2013.01);
(Continued)

(58) Field of Classification Search
CPC .............. B23B 51/048; B23B 2251/50; B23B 2200/0476; B23B 2251/408; B23B 2200/205; B23B 2200/247; B23B 2200/286; B23B 2251/282; B23B 2200/083; B23B 2251/406; B23B 51/04
See application file for complete search history.

(56) References Cited

U.S. PATENT DOCUMENTS 5,429,458 A   7/1995   Tukala et al.

FOREIGN PATENT DOCUMENTS

| JP | 06297220 A | * 10/1994 | ............. B23B 51/02 |
| JP | H06297220 A | 10/1994 | |

(Continued)

*Primary Examiner* — Eric A. Gates
*Assistant Examiner* — Paul M Janeski
(74) *Attorney, Agent, or Firm* — Viering, Jentschura & Partner MBB

(57) ABSTRACT

A cutting tool holder of the present disclosure includes a bar-shaped main body. The main body includes a first pocket to receive a first insert, a second pocket to receive a second insert, a first groove extending from the first pocket, and a second groove extending from the second pocket. The first groove includes a second opening located on a rear side in a rotation direction, and the second groove includes a fourth opening located on a rear side in the rotation direction in a cross section orthogonal to a rotation axis. An angle θ1 formed by the second opening and an outer peripheral surface of the main body is smaller than an angle θ2 formed by the fourth opening and the outer peripheral surface of the main body in a cross section orthogonal to the rotation axis.

14 Claims, 16 Drawing Sheets

(52) U.S. Cl.
CPC ... *B23B 2200/205* (2013.01); *B23B 2200/247* (2013.01); *B23B 2200/286* (2013.01); *B23B 2251/282* (2013.01); *B23B 2251/406* (2013.01); *B23B 2251/408* (2013.01); *B23B 2251/50* (2013.01)

(56) References Cited

FOREIGN PATENT DOCUMENTS

| | | | |
|---|---|---|---|
| JP | 2010110847 A | 5/2010 | |
| WO | WO-2009153066 A1 * | 12/2009 | ............. B23B 51/02 |
| WO | WO-2013018764 A1 * | 2/2013 | ......... B23B 51/0493 |
| WO | 2015030212 A1 | 3/2015 | |

\* cited by examiner

CUTTING TOOL HOLDER, CUTTING TOOL, AND METHOD OF MANUFACTURING MACHINED PRODUCT

CROSS-REFERENCE TO RELATED APPLICATIONS

This application is a national stage entry according to 35 U.S.C. 371 of PCT Application No. PCT/JP2016/081877 filed on Oct. 27, 2016, which claims priority to Japanese Application No. 2015-211394 filed on Oct. 28, 2015, which are entirely incorporated herein by reference.

TECHNICAL FIELD

The present disclosure relates to a cutting tool holder, a cutting tool, and a method of manufacturing a machined product.

BACKGROUND ART

A holder, whose front end is designed to receive an inside insert (inner cutting edge insert) and an outside insert (outer cutting edge insert), has conventionally been used for an insert type drill (drill) for use in a drilling process. Two chip discharge grooves are spaced apart from each other in a circumferential direction on an outer periphery of the holder. The two chip discharge grooves open while facing opposite directions in a cross section orthogonal to a rotation axis. Chips generated at the inside insert and the outside insert flow along the two chip discharge grooves.

In the drill including the inner cutting edge insert and the outer cutting edge insert, the chips generated at the inner cutting edge differ from the chips generated at the outer cutting edge insert in shape. Specifically, the chips generated at the outer cutting edge insert have a relatively short shape. The chips generated at the inner cutting edge insert are apt to have a shape spirally extending long at a short pitch. Consequently, a flow of the chips generated at the inner cutting edge insert may become unstable.

RELATED ART DOCUMENTS

Patent Document

Patent Document 1: Japanese Unexamined Patent Publication No. 2010-110847

SUMMARY

A cutting tool holder of the present disclosure includes a bar-shaped main body extending from a first end toward a second end along a rotation axis. The main body includes a first pocket, a second pocket, a first groove, and a second groove. The first pocket is located at the first end and designed to receive a first insert. The second pocket is located at the first end and designed to receive a second insert. The first groove spirally extends from the first pocket toward the second end. The second groove spirally extends from the second pocket toward the second end. The first groove includes a first opening located on a front side in a rotation direction of the rotation axis, and a second opening located on a rear side in the rotation direction in a cross section orthogonal to the rotation axis. The second groove includes a third opening located on a front side in the rotation direction, and a fourth opening located on a rear side in the rotation direction in a cross section orthogonal to the rotation axis. An angle $\theta_1$ formed by the second opening of the first groove and an outer peripheral surface of the main body is smaller than an angle $\theta_2$ formed by the fourth opening of the second groove and the outer peripheral surface of the main body in a cross section orthogonal to the rotation axis.

A cutting tool of the present disclosure includes a cutting tool holder in the present disclosure described above, a first insert attached to the first pocket in the cutting tool holder, and a second insert attached to the second pocket in the cutting tool holder.

A method of manufacturing a machined product in the present disclosure includes rotating a cutting tool in the above disclosure around the rotation axis, bringing the cutting tool being rotated into contact with a workpiece, and moving the cutting tool away from the workpiece.

EMBODIMENTS

Cutting Tool Holder and Cutting Tool

Figure 1:
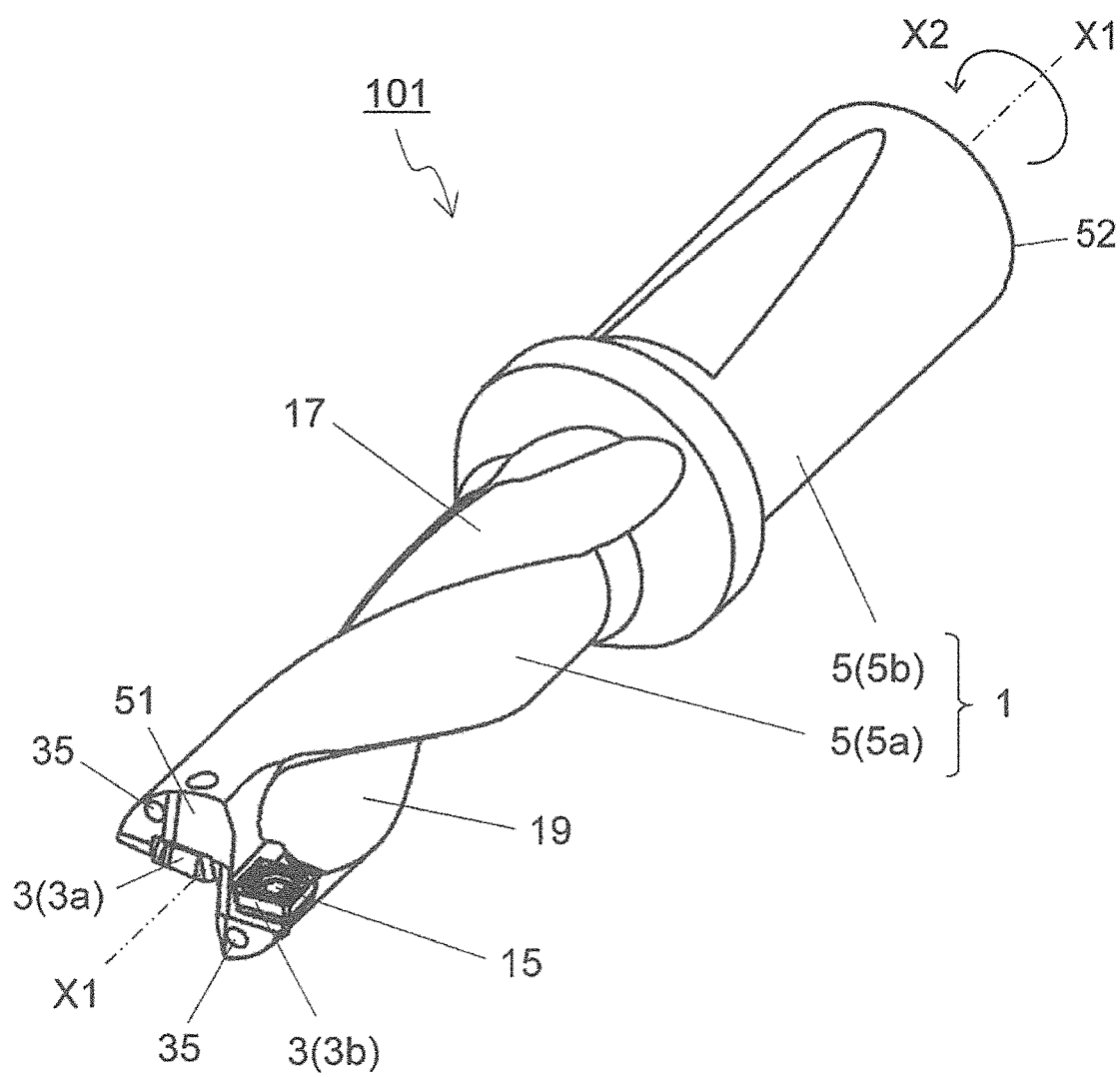
FIG. 1 is a perspective view illustrating a cutting tool (drill) in an embodiment of the present disclosure.

A cutting tool holder (hereinafter also referred to simply as "a holder") and a cutting tool including the holder in an embodiment of the present disclosure are described in detail below with reference to the drawings. For the sake of description, the drawings referred to in the following illustrate, in a simplified form, only main members necessary for describing embodiments. The holder and the cutting tool of the present disclosure are therefore capable of including any arbitrary structural member not illustrated in the drawings referred to. Sizes of the members in each of the drawings are not ones which faithfully represent sizes of actual structural members and size ratios of these members. These points are also true for a method of manufacturing a machined product described later.

The drill 101 is described as the cutting tool in the embodiment of the present disclosure with reference to FIGS. 1 to 13.

The drill 101 of the present embodiment includes the cutting tool holder 1 (hereinafter also referred to simply as the holder 1), and two cutting inserts 3 (hereinafter also referred to simply as "the inserts 3"). The drill 101 is usable, for example, a drilling process. In the embodiment illustrated in FIG. 1, the two inserts 3 are a first insert 3a and a second insert 3b. The drill 101 is structured by attaching these two inserts 3 to the holder 1.

The holder 1 has a rotation axis X1, and includes a bar-shaped main body 5 extending from a first end 51 toward a second end 52 along the rotation axis X1. Specifically, the main body 5 in the present embodiment has an approximately columnar shape. The drill 101 is rotated around the rotation axis X1 during a cutting process of a workpiece. A rotation direction of the drill 101 around the rotation axis X1 is indicated by X2. A central axis of the approximately columnar shaped holder 1 coincides with the rotation axis X1 of the holder 1 in the present embodiment.

Hereinafter, a direction approaching the rotation axis X1 is referred to as "an inner peripheral direction (inward direction), and a direction away from the rotation axis X1 is referred to as "an outer peripheral direction (outward direction) in the cross section orthogonal to the rotation axis X1. A direction from a rear end of the holder 1 (the second end 52 of the main body 5) toward a front end thereof (the first end 51 of the main body 5) is referred to as "a front end direction," and a front side in the front end direction is referred to as "a front end side." A direction from the front end of the holder 1 toward the rear end thereof is referred to as "a rear end direction," and a rear side in the rear end direction is referred to as "a rear end side."

Figure 2:
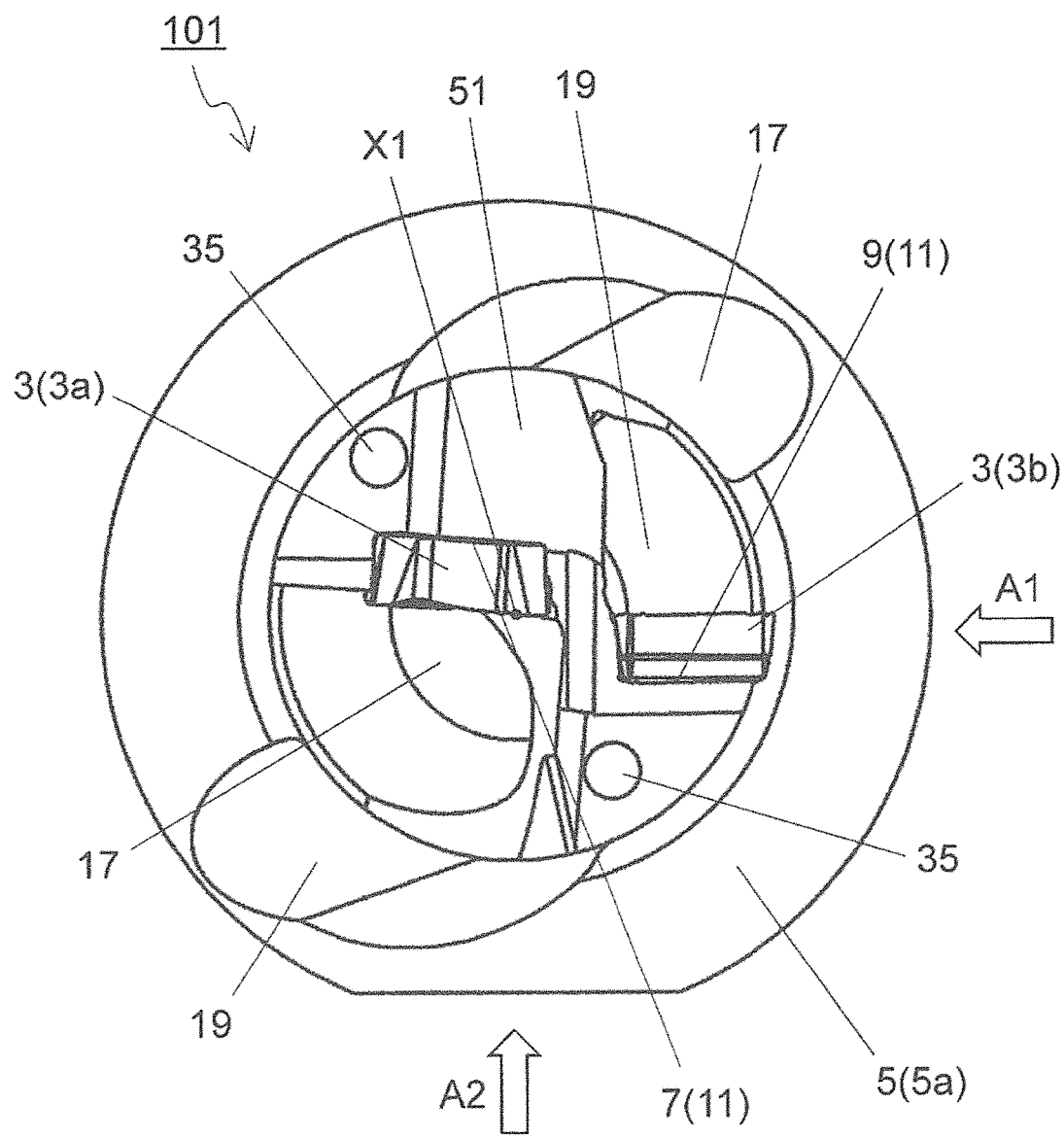
FIG. 2 is a front view of a first end in the cutting tool illustrated in FIG. 1.
Figure 3:
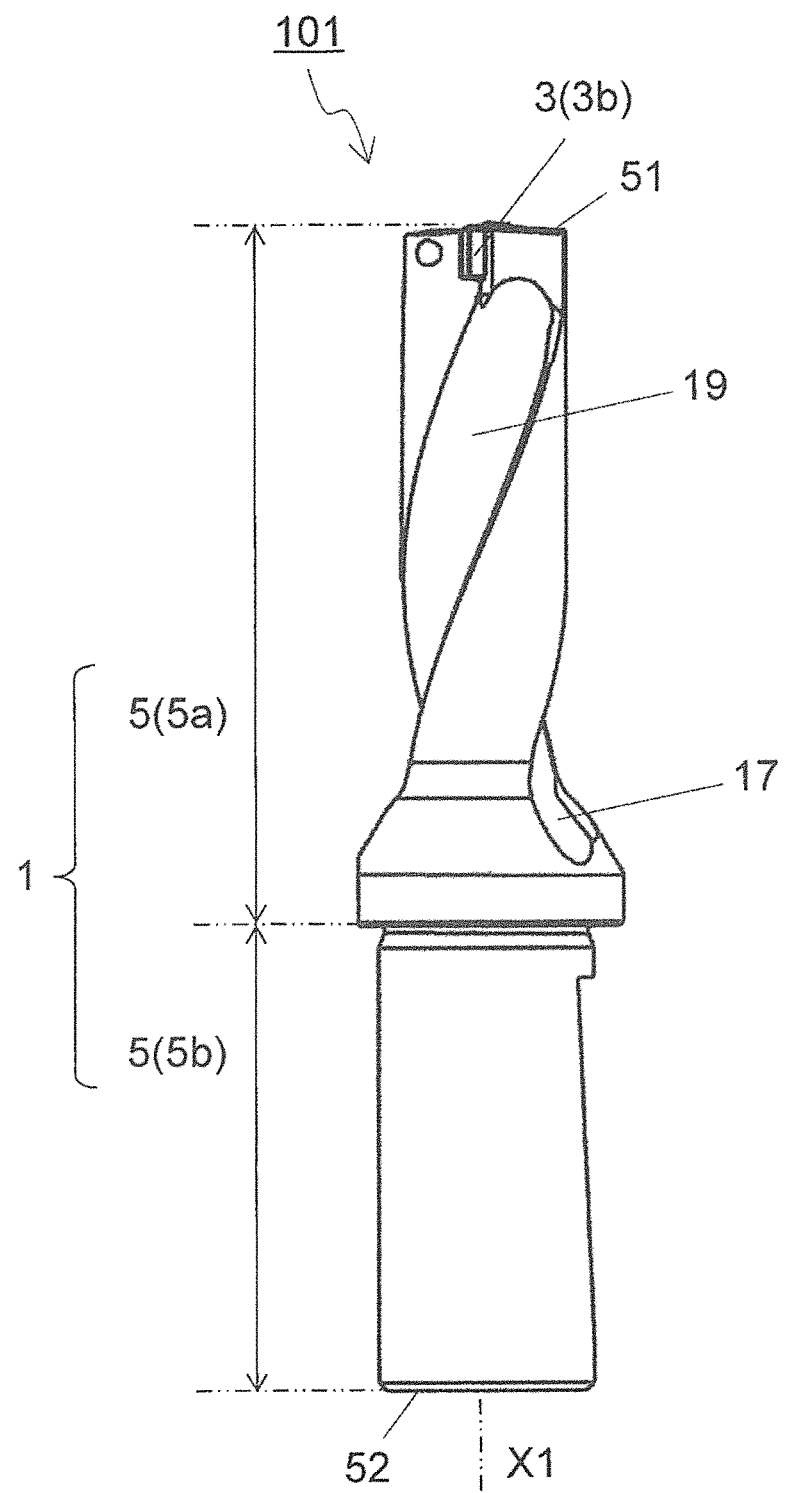
FIG. 3 is a side view from A1 direction in the cutting tool illustrated in FIG. 2.
Figure 4:
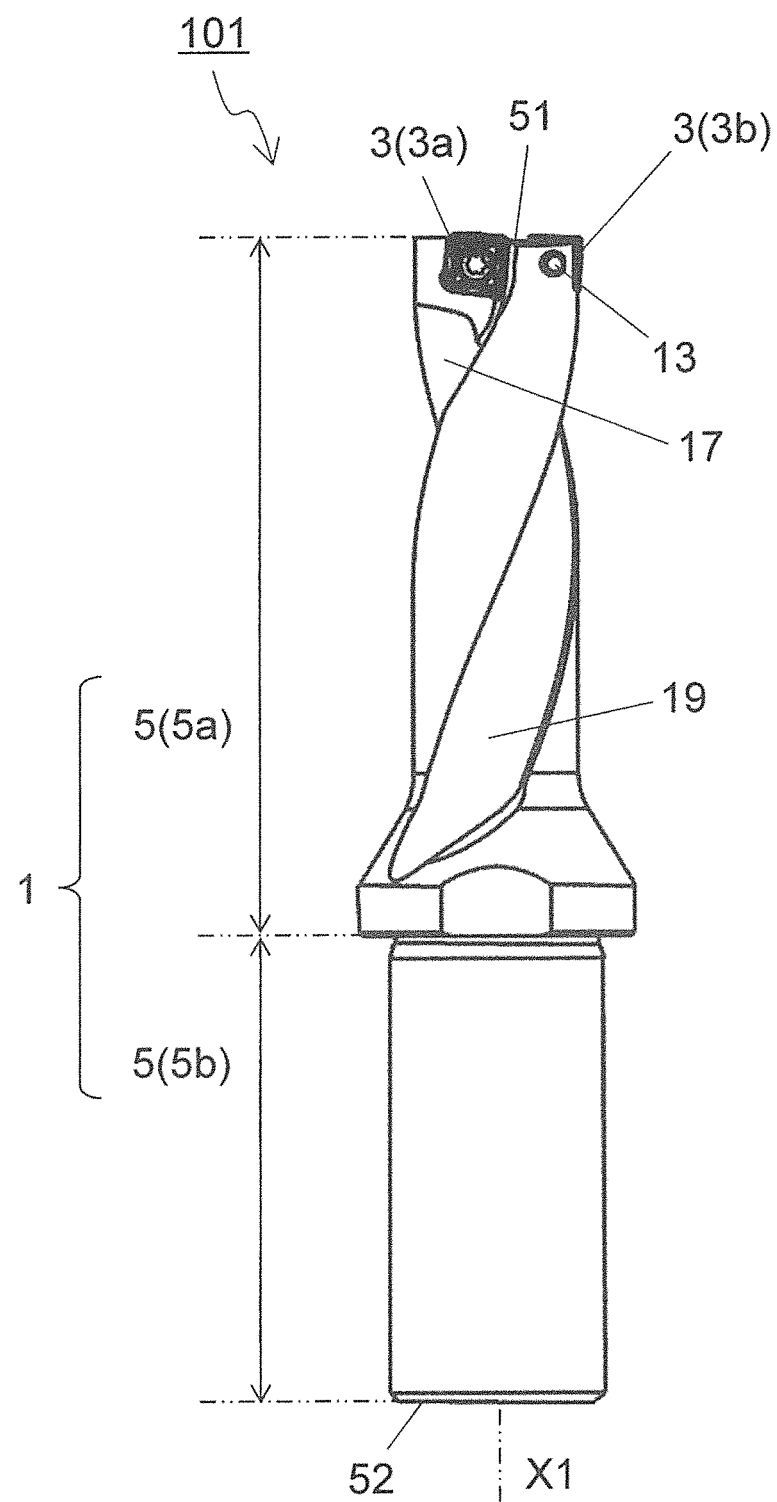
FIG. 4 is a side view from A2 direction in the cutting tool illustrated in FIG. 2.
Figure 5:
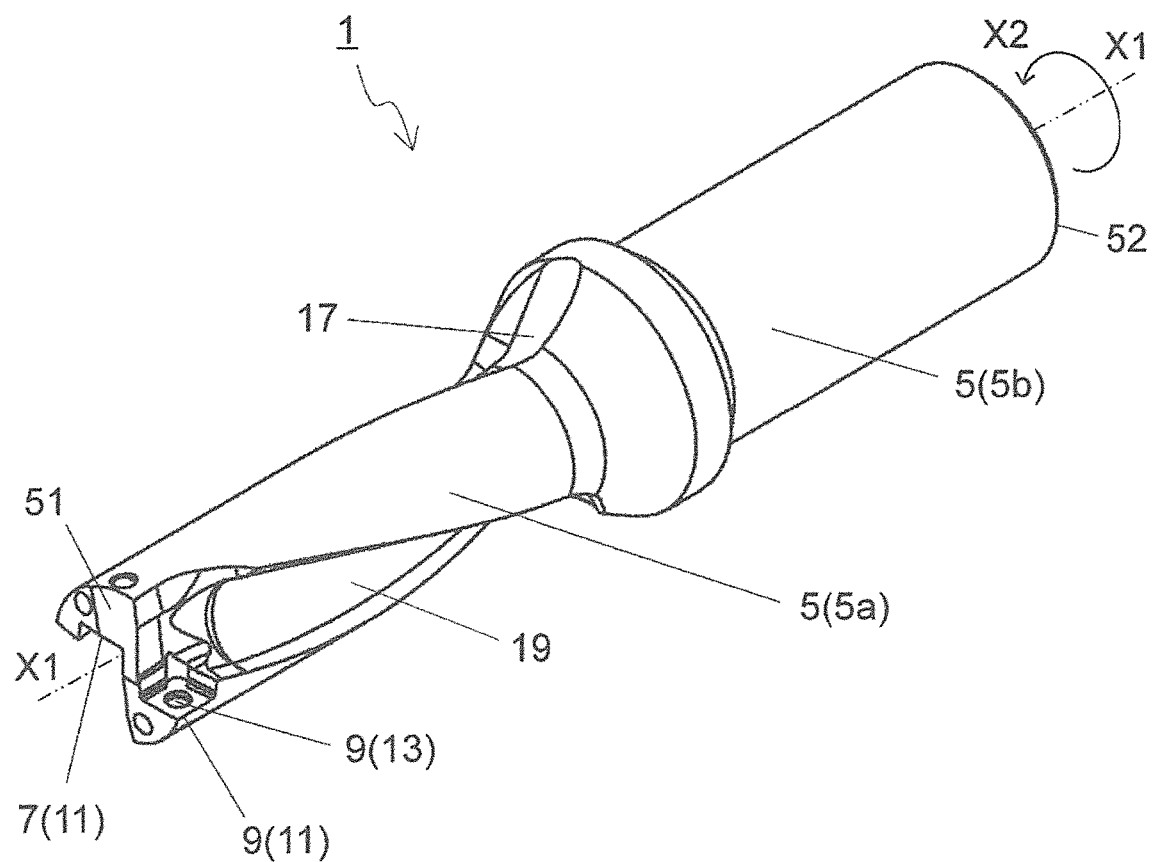
FIG. 5 is a perspective view illustrating a cutting tool holder in the cutting tool illustrated in FIG. 1.
Figure 6:
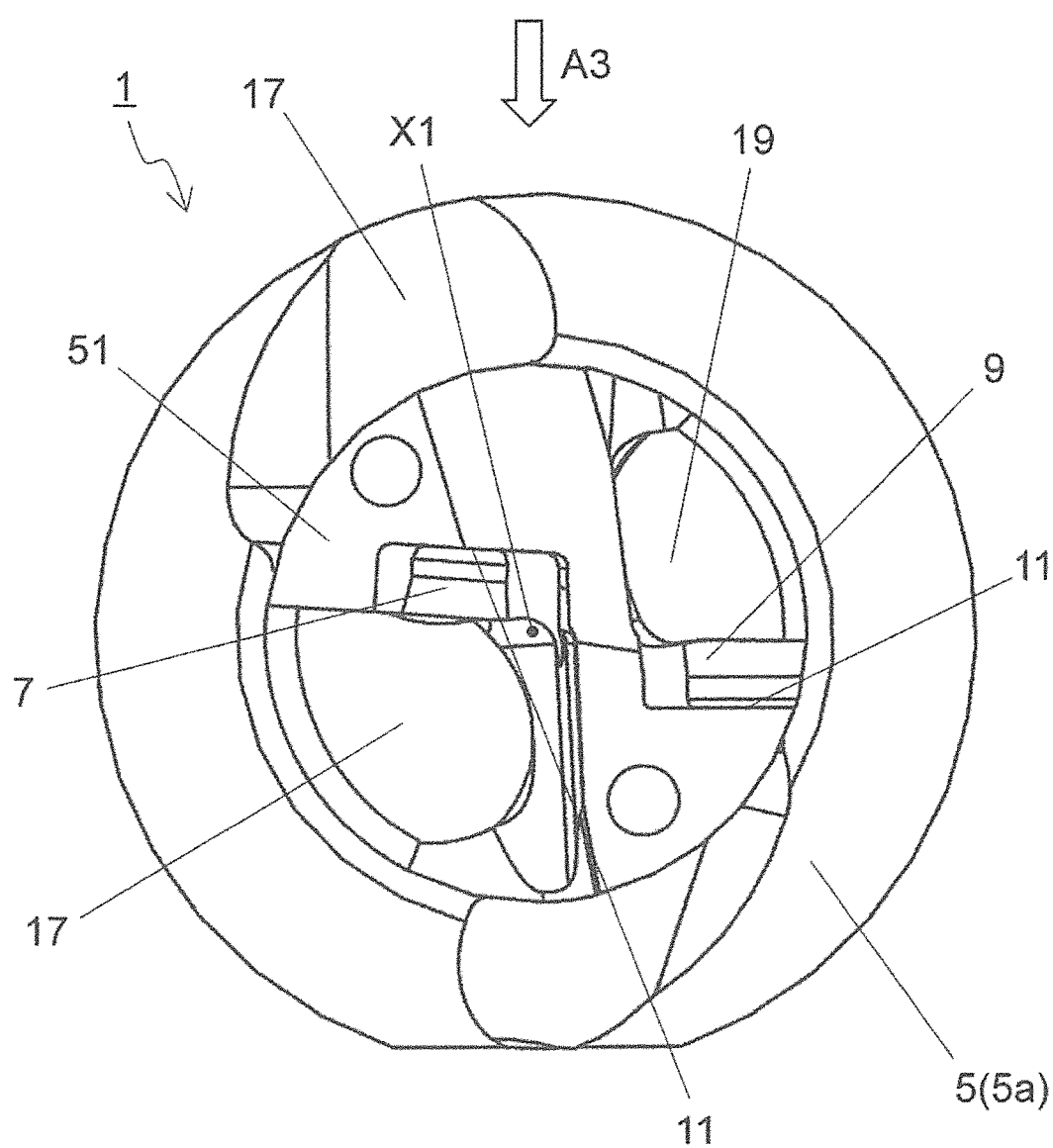
FIG. 6 is a front view of a first end in the cutting tool holder illustrated in FIG. 5.
Figure 7:
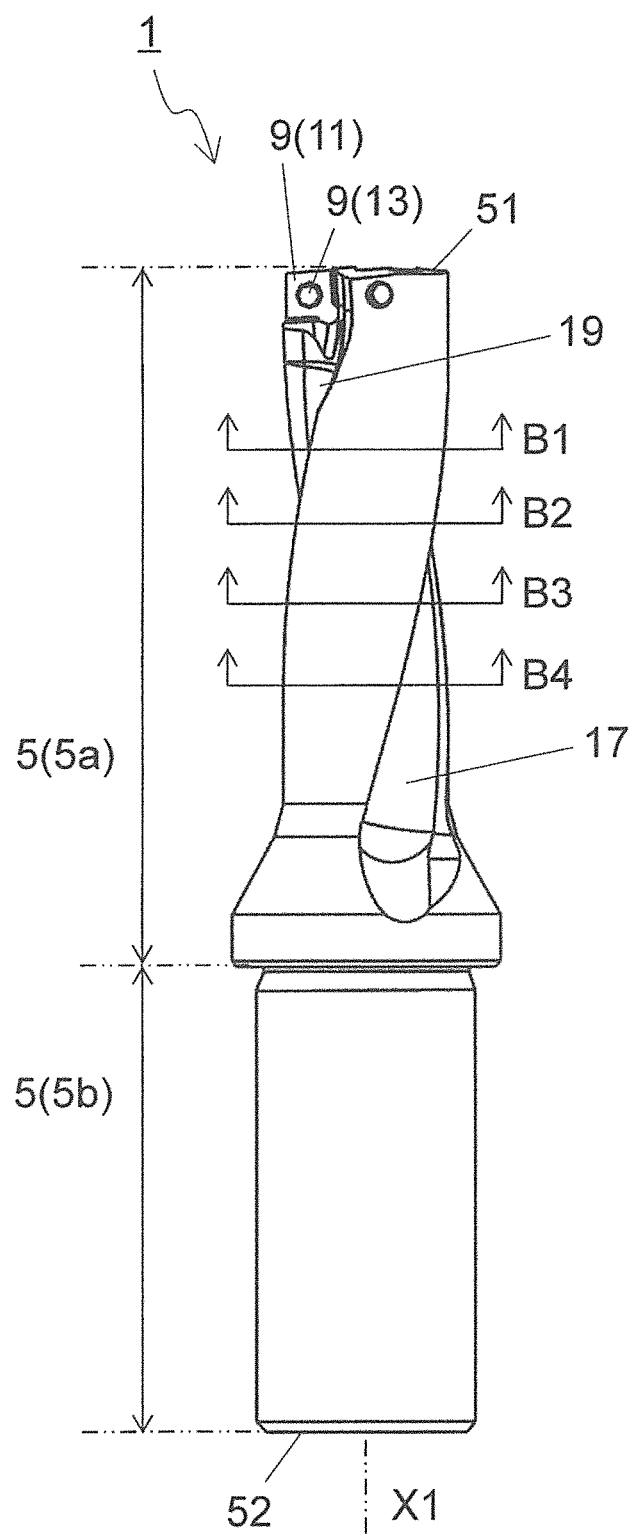
FIG. 7 is a side view from A3 direction in the cutting tool holder illustrated in FIG. 5.

The main body 5 in the present embodiment includes a first part 5a located on the front end side, and a second part 5b located on the rear end side. As illustrated in FIGS. 2, 5, and 6, the first part 5a includes a first pocket 7 located at the first end 51 and designed to receive the first insert 3a, and a second pocket 9 located at the first end 51 and designed to receive the second insert 3b. An outer diameter of the second part 5b is approximately constant. The second part 5b is designed to be held by a machine tool (not shown), and is generally called "shank."

As illustrated in FIG. 5, the first pocket 7 disposed in the first part 5a opens forward in the rotation direction X2 at an inner peripheral side on the front end side of the holder 1. The second pocket 9 disposed in the first part 5a opens forward in the rotation direction X2 at an outer peripheral side on the front end side of the holder 1. As illustrated in FIG. 2, the second pocket 9 is located further away from the rotation axis X1 than the first pocket 7. Therefore, the second insert 3b attached to the second pocket 9 is usable as an outer cutting edge insert. The first insert 3a attached to the first pocket 7 is usable as an inner cutting edge insert. The first pocket 7 and the second pocket 9 are disposed separate from each other in order to avoid contact between the first insert 3a and the second insert 3b.

In the drill 101 including the two inserts 3, one of the two inserts 3 is generally attached to a position relatively close to the rotation axis X1 of the holder 1, and the other of the two inserts 3 is attached to a position relatively away from the rotation axis X1 of the holder 1. A workpiece can be subjected to the drilling process by the rotation of these two inserts 3 around the rotation axis X1. Here, the insert 3 attached to the position relatively close to the rotation axis X1 of the holder 1 is called the inner cutting edge insert. The insert 3 attached to the position relatively away from the rotation axis of the holder is called the outer cutting edge insert.

As illustrated in FIG. 5, each of the first pocket 7 and the second pocket 9 includes a mounting surface 11 designed to mount the insert 3 thereon. The mounting surface 11 is provided with a screw hole 13, and the insert 3 is fixable to the holder 1 by fitting a screw 15 into the screw hole 13 (refer to FIG. 1).

An outer diameter of the first part 5a of the holder 1 in the present embodiment is settable to, for example, 6-42.5 mm. The holder 1 of the present embodiment is settable to L=2D to L=12D when L is an axial length (length of the first part 5a), and D is a diameter (outer diameter of the first part 5a).

For example, steels, cast irons, or aluminum alloys are usable as a material of the main body 5. Of these materials, high-rigidity steel is used for the main body 5 in the present embodiment.

As illustrated in FIGS. 1 to 7, the main body 5 in the holder 1 of the present embodiment includes a first groove 17 and the second groove 19. The first groove 17 spirally extends from the first pocket 7 toward the second end 52 (the rear end of the main body 5). The second groove 19 spirally extends from the second pocket 9 toward the second end 52 (the rear end of the main body 5). Here, the first groove 17 and the second groove 19 are formed in the first part 5a in the main body 5 but not formed in the second part 5b.

The first groove 17 and the second groove 19 spirally extend toward the rear end of the main body 5 and are located separate from each other. The first groove 17 and the second groove 19 are grooves along which chips generated at the insert 3 when cutting a workpiece are discharged toward the rear end side of the main body 5. Therefore, the first groove 17 and the second groove 19 are also referred to as a chip discharge groove.

As described earlier, the first groove 17 extends from the first pocket 7. The second groove 19 extends from the second pocket 9. A depth of the first groove 17 is greater than a depth of the second groove 19.

The depth of the first groove 17 is settable to, for example, 15-40% of the outer diameter of the first part 5a. The depth of the second groove 19 is settable to, for example, 10-35% of the outer diameter of the first part 5a. As used herein, the depth of each of the first groove 17 and the second groove 19 denotes a value obtainable by subtracting a distance between a bottom of the first groove 17 or a bottom of the second groove 19 and the rotation axis X1, from a radius of the first part 5a in the cross section orthogonal to the rotation axis X1.

A diameter of a web thickness is settable to, for example, 25-75% of the outer diameter of the first part 5a. The diameter of the web thickness is equivalent to a diameter of a maximum circle (inscribed circle) formable in a cross section of the first part 5a orthogonal to the rotation axis X1. Specifically, when the outer diameter D of the first part 5a is 20 mm, the depth of the first groove 17 is settable to 3-8 mm, and the depth of the second groove 19 is settable to 2-7 mm. As apparent from the holder 1 provided with the first pocket 7, the second pocket 9, the first groove 17, and the second groove 19, the holder 1 does not have a strict columnar shape.

As illustrated in FIGS. 8 to 11, in the holder 1 of the present embodiment, the first groove 17 includes a first opening 21a located on the front side in the rotation direction X2 of the rotation axis X1, and a second opening 21b located on the rear side in the rotation direction X2 in the cross section orthogonal to the rotation axis X1. The second groove 19 includes a third opening 21c located on the front side in the rotation direction X2, and a fourth opening 21d located on the rear side in the rotation direction X2 in the cross section orthogonal to the rotation axis X1. An angle formed by the second opening 21b of the first groove 17 and an outer peripheral surface 53 of the main body 5 in the cross section orthogonal to the rotation axis X1 is indicated by θ1. An angle formed by the fourth opening 21d of the second groove 19 and the outer peripheral surface 53 of the main body 5 in the same cross section is indicated by θ2. The angle θ1 is smaller than the angle θ2 in the present embodiment. In other words, the angle θ1 and the angle θ2 have a relationship of θ1<θ2.

With this configuration, the chips generated at the first insert 3a which are apt to spirally extend long at the small pitch are stably contactable with a part of the first groove 17 located on the rear side in the rotation direction X2 of the rotation axis X1. Thus, the chips generated at the first insert 3a are less likely to fly from the first groove 17 toward the outside of the outer peripheral surface 53 of the main body 5. This contributes to stabilizing behavior of the chips in the first groove 17. Consequently, the chips generated at the first insert 3a are less likely to damage a machined surface of a workpiece. In other words, the above configuration makes it easier to stably control a flow direction of the chips in the first groove 17, thus ensuring that the chips are less likely to undesirably fly outward. Hence, the drill 101 including the holder 1 in the present embodiment has high accuracy of the machined surface because of the stable chip flow.

In the present embodiment, the first groove 17 and the second groove 19 open outward from the rotation axis X1 in the cross section orthogonal to the rotation axis X1. The configuration that the angle θ1 is smaller than the angle θ2 can therefore be rephrased saying that, as compared with the second groove 19, the first groove 17 opens forward in the rotation direction X2 of the rotation axis X1.

As illustrated in FIGS. 8 to 11, the angle θ1 is evaluable by an angle formed by a tangent line L1 of the outer peripheral surface 53 of the main body 5 at an opening end 21b1 of the second opening 21b, and a tangent line L2 of the second opening 21b at the opening end 21b1 of the second opening 21b. The angle θ2 is evaluable by an angle formed by a tangent line L3 of the outer peripheral surface 53 of the main body 5 at an opening end 21d1 of the fourth opening 21d, and a tangent line L4 of the fourth opening 21d at the opening end 21d1 of the fourth opening 21d. A dimension of the angle θ1 is settable to, for example, 50-80°. A dimension of the angle θ2 is settable to, for example, 60-90°.

Figure 9:
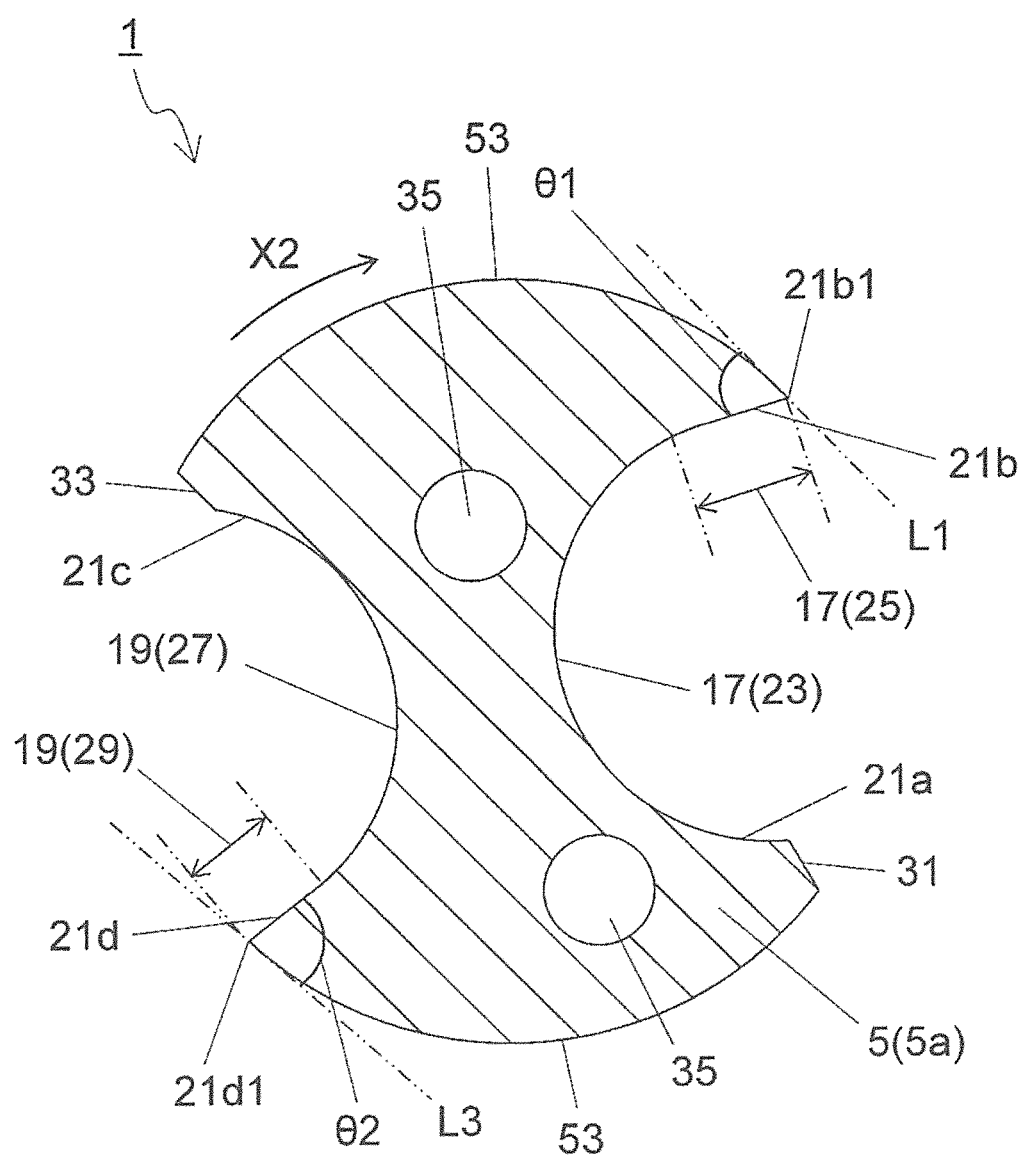
FIG. 9 is a sectional view taken along line B2 in FIG. 7.
Figure 10:
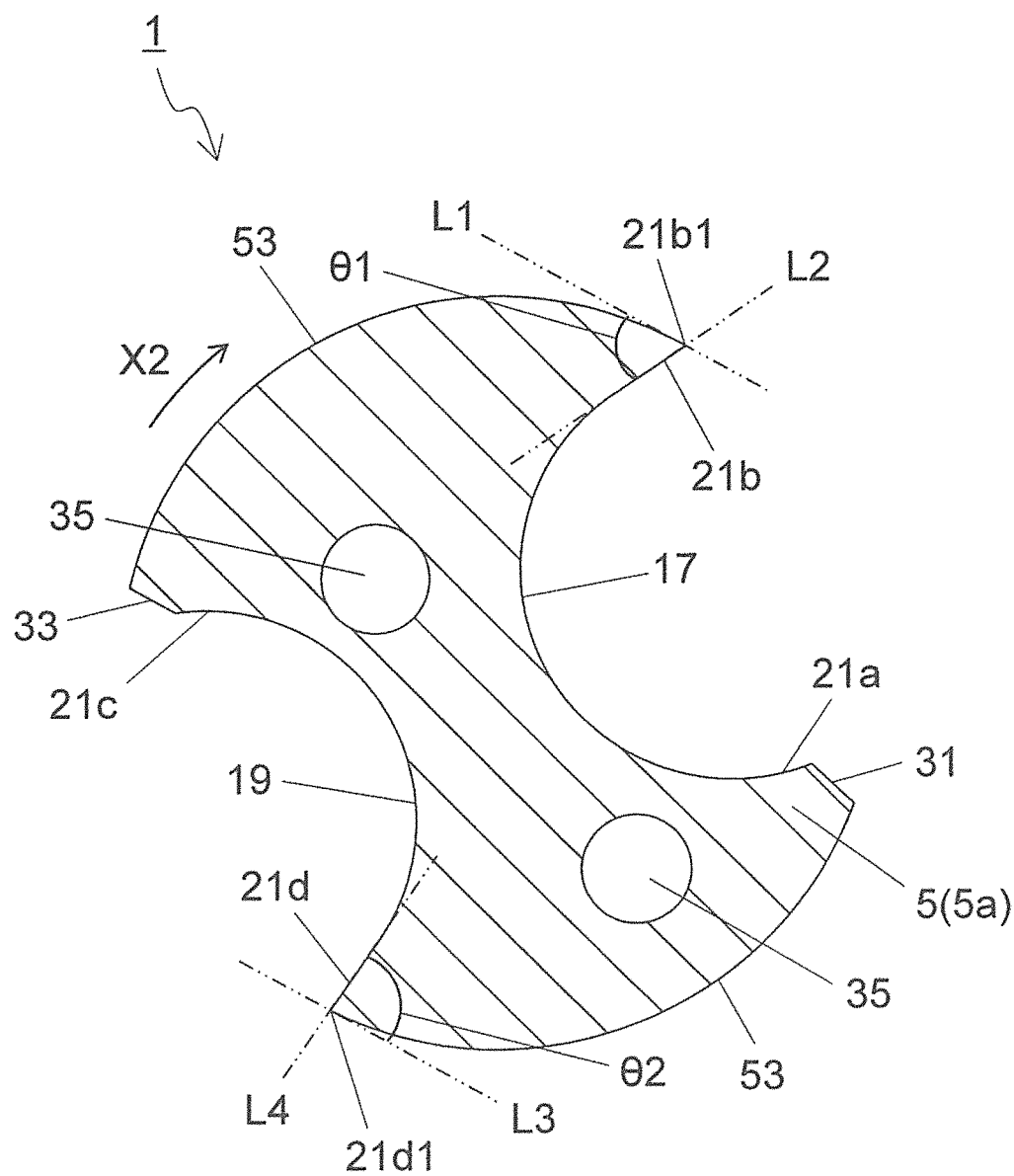
FIG. 10 is a sectional view taken along line B3 in FIG. 7.
Figure 11:
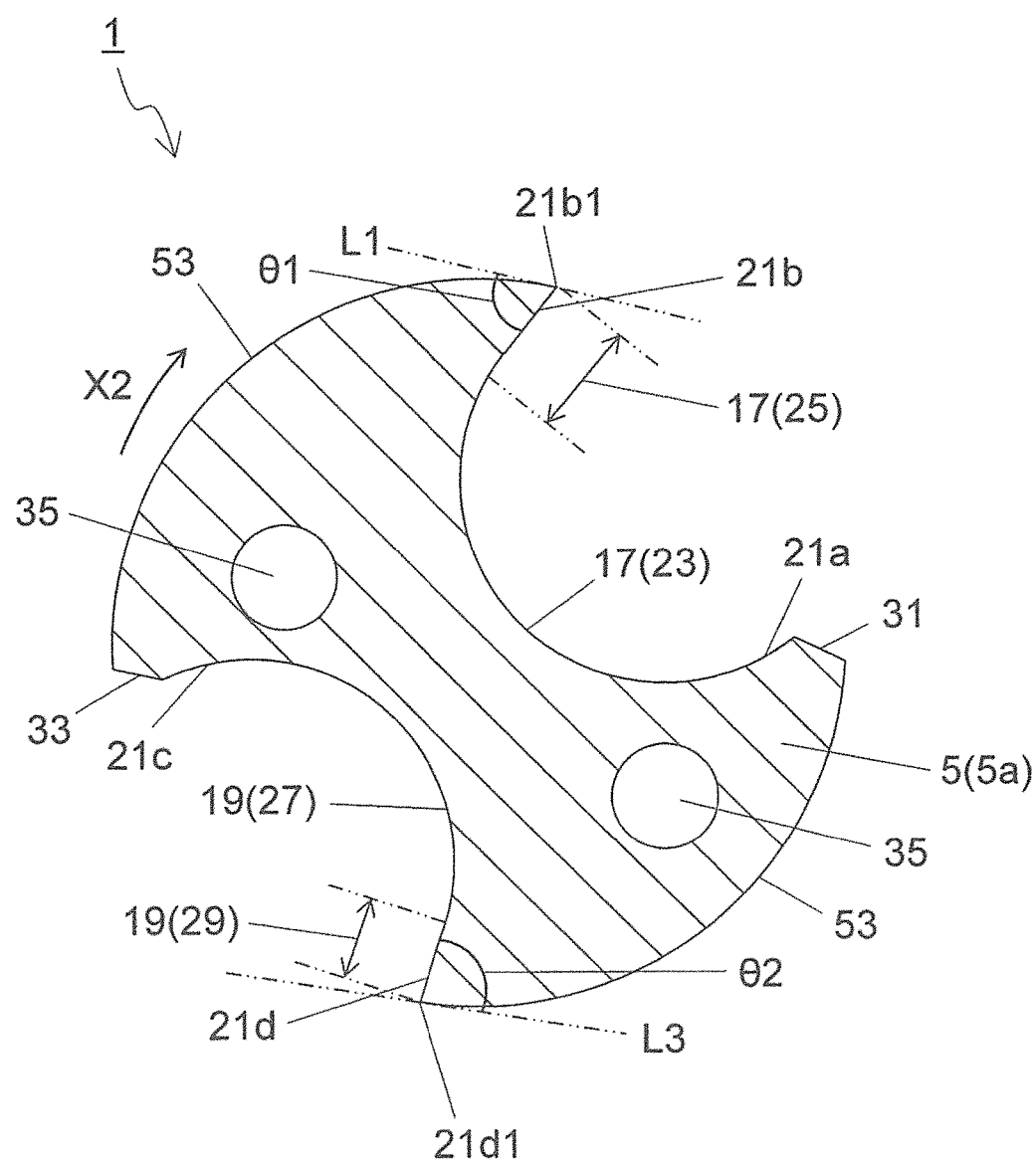
FIG. 11 is a sectional view taken along line B4 in FIG. 7.

As illustrated in FIG. 9, the first groove 17 in the present embodiment may include a first region 23 (bottom part) having a concave curvilinear shape, and a second region 25 (wall surface part) having a straight line shape in the cross section orthogonal to the rotation axis X1. Here, the second region 25 may be continuous with the first region 23 at a rear side in the rotation direction X2 of the rotation axis X1. When this configuration is satisfied, chips flowing along the first groove 17 can easily come into contact with the second region 25. When chips are curved while the second region 25 has the straight line shape in the cross section described above, it is possible to reduce a contact area between the chips and the second region 25. The chips are therefore less likely to accumulate in the first groove 17.

The second region 25 may be located at the second opening 21b. When this configuration is satisfied, it is possible to improve strength at the second opening 21b. Here, the angle θ1 is evaluable by the second region 25 and the tangent line L1 of the outer peripheral surface 53 of the main body 5 in the cross section orthogonal to the rotation axis X1.

As illustrated in FIG. 9, the second groove 19 in the present embodiment may include a third region 27 (bottom part) having a concave curvilinear shape and a fourth region 29 (wall surface part) having a straight line shape in the cross section orthogonal to the rotation axis X1. Here, the fourth region 29 may be continuous with the third region 27 at a rear side in the rotation direction X2 of the rotation axis X1. When this configuration is satisfied, chips flowing along the second groove 19 can easily come into contact with the fourth region 29. When chips are curved while the fourth region 29 has the straight line shape in the cross section described above, it is possible to reduce a contact area between the chips and the fourth region 29. The chips are therefore less likely to accumulate in the second groove 19.

The fourth region 29 may be located at the fourth opening 21d. When this configuration is satisfied, it is possible to improve strength at the fourth opening 21d. Here, the angle θ2 is evaluable by the fourth region 29 and the tangent line L3 of the outer peripheral surface 53 of the main body 5 in the cross section orthogonal to the rotation axis X1.

In the holder 1 of the present embodiment, the second region 25 may be longer than the fourth region 29 in the cross section orthogonal to the rotation axis X1. As described earlier, the chips flowing along the first groove 17 are apt to spirally extend long at the small pitch. In cases where the first groove 17 includes the second region 25 longer than the fourth region 29, it is possible to reduce an area of a part of the first groove 17 which comes into contact with the chips. The chips are therefore much less likely to accumulate in the first groove 17.

A curvature radius of the first region 23 may be smaller than a curvature radius of the third region 27 in the cross section orthogonal to the rotation axis X1. With this configuration, it is possible to further enhance the rigidity of the holder 1.

In the holder 1 of the present embodiment, the first opening 21a may include a first surface 31 having a straight line shape being continuous with the outer peripheral surface 53 of the main body 5 in the cross section orthogonal to the rotation axis X1. In other words, a cutout may exist between the first region 23 (bottom part) and the outer peripheral surface 53 of the main body 5 in the first groove 17. When this configuration is satisfied, chips can easily come into contact with a part of the first groove 17 which is located on the rear side in the rotation direction X2, and the chips are supportable at the part. A part of the first groove 17 which is located on the front side in the rotation direction X2 of the rotation axis X1 need not support the chips. When provided with the first surface 31, a wide space that permits passage of chips can be ensured without changing the configuration of the part of the first groove 17 which supports the chips. Hence, the chips are much less likely to accumulate in the first groove 17.

For the same reason as the first surface 31, in the holder 1 of the present embodiment, the third opening 21c may include a second surface 33 having a straight line shape being continuous with the outer peripheral surface 53 of the main body 5 in the cross section orthogonal to the rotation axis X1. In other words, a cutout may exist between the third region 33 (bottom part) and the outer peripheral surface 53 of the main body 5 in the second groove 19. When provided with the second surface 33, a wide space that permits passage of chips can be ensured without changing the configuration of the part of the second groove 19 which supports the chips. Hence, the chips are much less likely to accumulate in the second groove 19.

Figure 8:
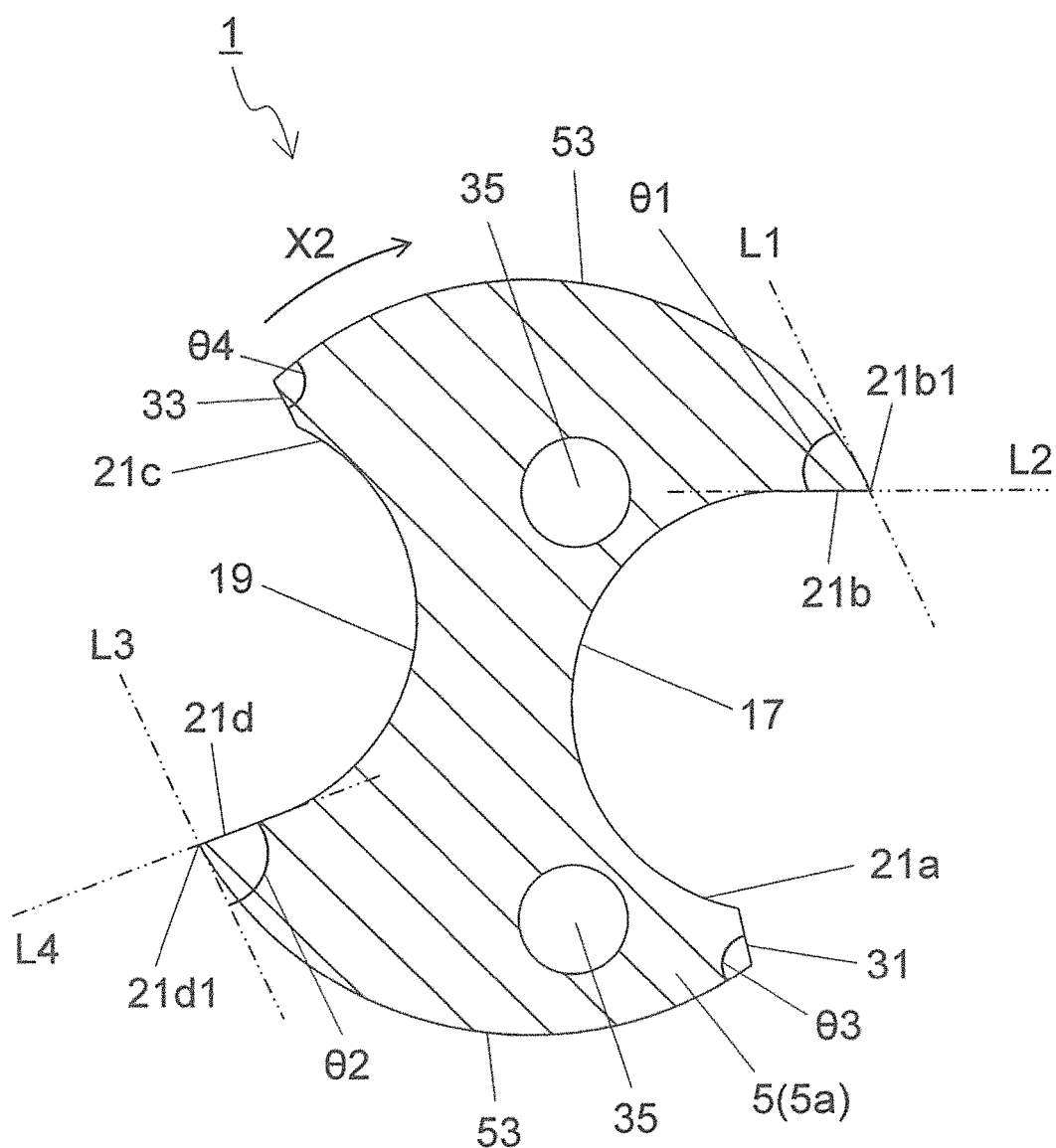
FIG. 8 is a sectional view taken along line B1 in FIG. 7.

As illustrated in FIG. 8, an angle θ3 formed by the first surface 31 and the outer peripheral surface 53 of the main body 5 may be an obtuse angle in the cross section orthogonal to the rotation axis X1. With this configuration, it is possible to maintain the strength of the main body 5, and the main body 5 is less likely to fracture. For the same reason as the angle θ3, an angle θ4 formed by the second surface 33 and the outer peripheral surface 53 of the main body 5 may be an obtuse angle in the cross section orthogonal to the rotation axis X1. Each of the angle θ3 and the angle θ4 is, for example, 80-120°. The angle θ3 is identical to the angle θ4 in the present embodiment.

The holder 1 of the present embodiment includes a through hole 35 extending from the rear end (second end 52) to the front end (first end 51) in the main body 5. The through hole 35 is a hole through which a coolant used for cooling the first insert 3a and the second insert 3b is supplied from an exterior. Therefore, the through hole 35 extends toward the first pocket 7 and the second pocket 9.

The first insert 3a is attached to the first pocket 7 in the holder 1. The second insert 3b is attached to the second pocket 9 in the holder 1.

Figure 12:
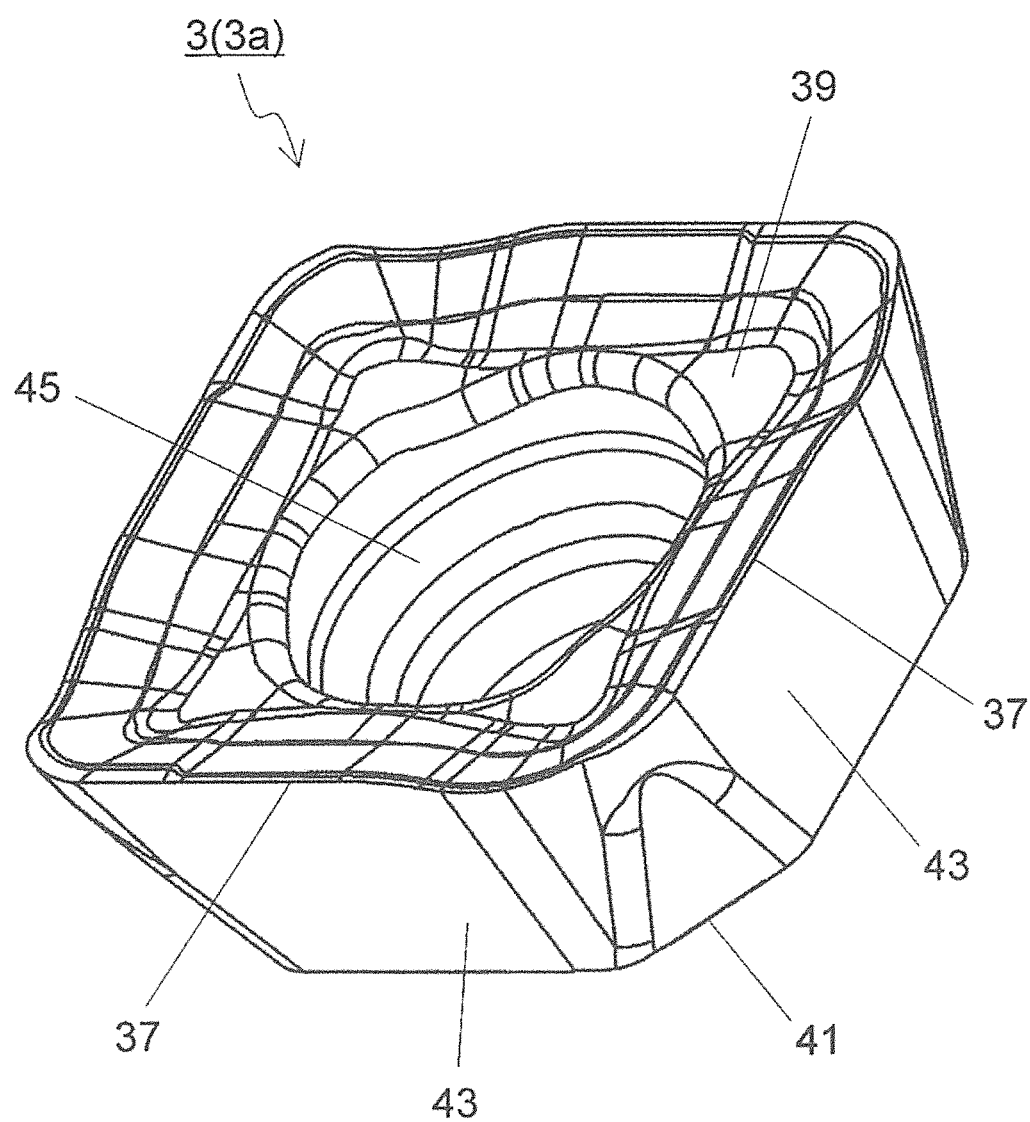
FIG. 12 is a perspective view illustrating a first insert in the cutting tool illustrated in FIG. 1.
Figure 13:
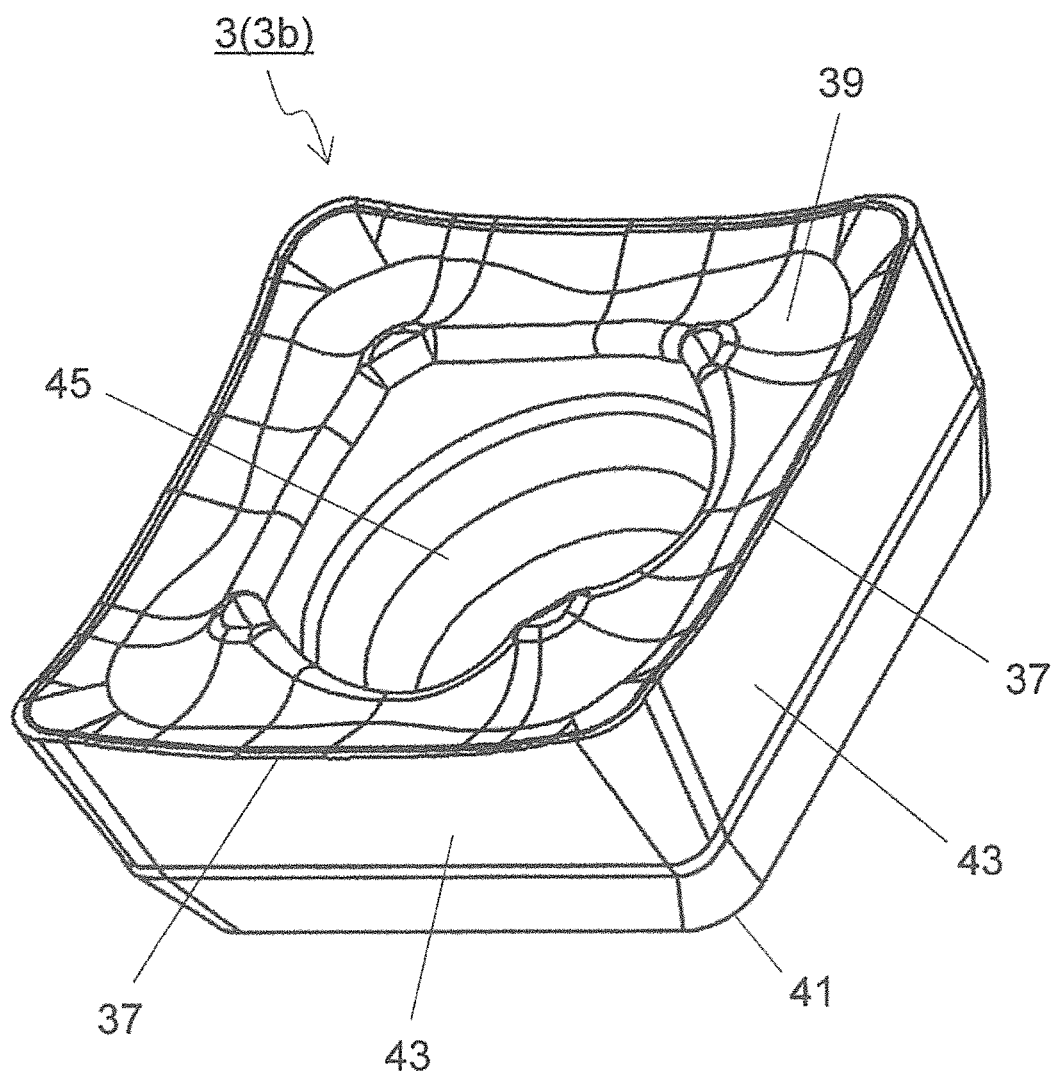
FIG. 13 is a perspective view illustrating a second insert in the cutting tool illustrated in FIG. 1.

As illustrated in FIGS. 12 and 13, the first insert 3a and the second insert 3b have a quadrangular prism shape (quadrangular plate shape) including a cutting edge 37. Specifically, the first insert 3a and the second insert 3b have the quadrangular prism shape including a quadrangular upper surface 39, a quadrangular lower surface 41, and a side surface 43 located between the upper surface 39 and the lower surface 41. When the first insert 3a and the second insert 3b are already attached to the holder 1, the upper surface 39 is located on the front side in the rotation direction X2 of the rotation axis X1, and the lower surface 41 is located on the rear side in the rotation direction X2 of the rotation axis X1. The side surface 43 is made up of four surface regions corresponding to four sides of each of the upper surface 39 and the lower surface 41 each having the quadrangular shape.

When the first insert 3a and the second insert 3b are already attached to the holder 1, the lower surface 41 is in contact with the mounting surface 11 of the holder 1. When the first insert 3a is already attached to the holder 1, a part of the side surface 43 protrudes more toward the front end side than the holder 1. When the second insert 3b is already attached to the holder 1, a part of the side surface 43 protrudes more toward the outer peripheral side and the front end side than the holder 1.

The cutting edge 37 is disposed in at least a part of a ridge line where the upper surface 39 intersects with the side surface 43. The cutting edge 37 located at the first insert 3a is referred to as an inner cutting edge, and the cutting edge 37 located at the second insert 3b is referred to as an outer cutting edge. The first insert 3a and the second insert 3b may have an identical shape or different shapes.

The phrase that the upper surface 39 and the lower surface 41 have the quadrangular shape denotes that both need to have an approximately quadrangular shape and need not to have a strict quadrangular shape. Four corners thereof may have a rounded shape in a front view, and sides located so as to connect to the corners adjacent to each other need not to have a strict straight line shape. A part of the sides may be made into a concavo-convex shape.

Because the cutting edge 37 is disposed in at least the part of the ridge line where the upper surface 39 intersects with the side surface 43, and because the upper surface 39 is located on the front side in the rotation direction X2 of the rotation axis X1, at least a part of the upper surface 39 functions as a rake surface that permits passage of chips during a cutting process, and at least a part of the side surface 43 functions as a flank surface during the cutting process.

For example, cemented carbide or cermet is usable as a material of the insert 3. Examples of compositions of the cemented carbide include WC—Co, WC—TiC—Co, and WC—TiC—TaC—Co. The WC—Co is produced by adding cobalt (Co) powder to tungsten carbide (WC), followed by sintering. The WC—TiC—Co is produced by adding titanium carbide (TiC) to WC—Co. The WC—TiC—TaC—Co is produced by adding tantalum carbide (TaC) to WC—TiC—Co.

The cermet is a sintered composite material obtainable by compositing metal into a ceramic ingredient. A specific example of the cermet is one which is composed mainly of a titanium compound, such as titanium carbide (TiC) or titanium nitride (TiN).

A surface of the insert 3 may be coated with a coating film by using chemical vapor deposition (CVD) method or physical vapor deposition (PVD) method. As a composition of the coating film, there are, for example, titanium carbide (TiC), titanium nitride (TiN), titanium carbonitride (TiCN), and alumina ($Al_2O_3$).

In order to enhance strength of the cutting edge 37, the insert 3 may have a structure in which, for example, a diamond sintered body or CBN sintered body is brazed to a base material made of the above material.

The first insert 3a and the second insert 3b in the present embodiment include a hole part 45 extending from the lower surface 41 to the upper surface 39. The hole part 45 in the present embodiment is disposed from the lower surface 41 in a direction along the rotation direction X2.

The hole part 45 is a member for screwing the insert 3 to the holder 1. Specifically, the insert 3 is fixable to the holder 1 by inserting the screw 15 into the hole part 45 of the insert 3, then inserting a front end of the screw 15 into the screw hole 13 formed in the mounting surface 11, and finally fitting the screw 15 into the screw hole 13.

A size of each of the first insert 3a and the second insert 3b is not particularly limited. For example, a thickness of each of the first insert 3a and the second insert 3b in a direction from the upper surface 39 toward the lower surface 41 is settable to approximately 3-10 mm in a front end view. A length of each of the four sides of the upper surface 39 is settable to approximately 5-20 mm.

In the drill 101 of the present embodiment, the first insert 3a and the second insert 3b are attached to the holder 1 so that the upper surface 39 is inclined with respect to the rotation axis X1 in a side view. An inclination angle thereof is a so-called axial rake angle, and is settable to, for example, approximately 0-20° in the present embodiment.

Method of Manufacturing Machined Product

A method of manufacturing a machined product in an embodiment of the present disclosure is described below with reference to the drawings.

The machined product is manufacturable by subjecting a workpiece to a cutting process. The method of manufacturing the machined product in the present embodiment includes the following steps:

(1) rotating the drill 101, as a cutting tool, represented by the foregoing embodiment around the rotation axis X1;

(2) bringing the drill 101 being rotated into contact with the workpiece 201; and (3) moving the drill 201 away from the workpiece 201.

Figure 14:
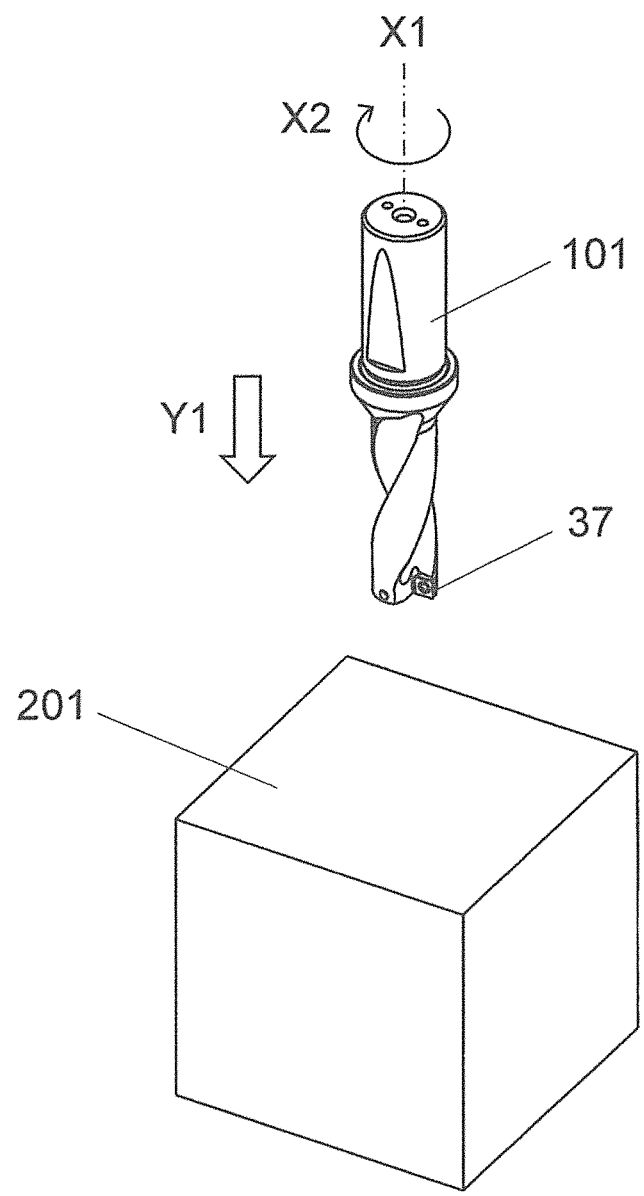
FIG. 14 is a schematic diagram illustrating a step in a method of manufacturing a machined product in an embodiment of the present disclosure.
Figure 15:
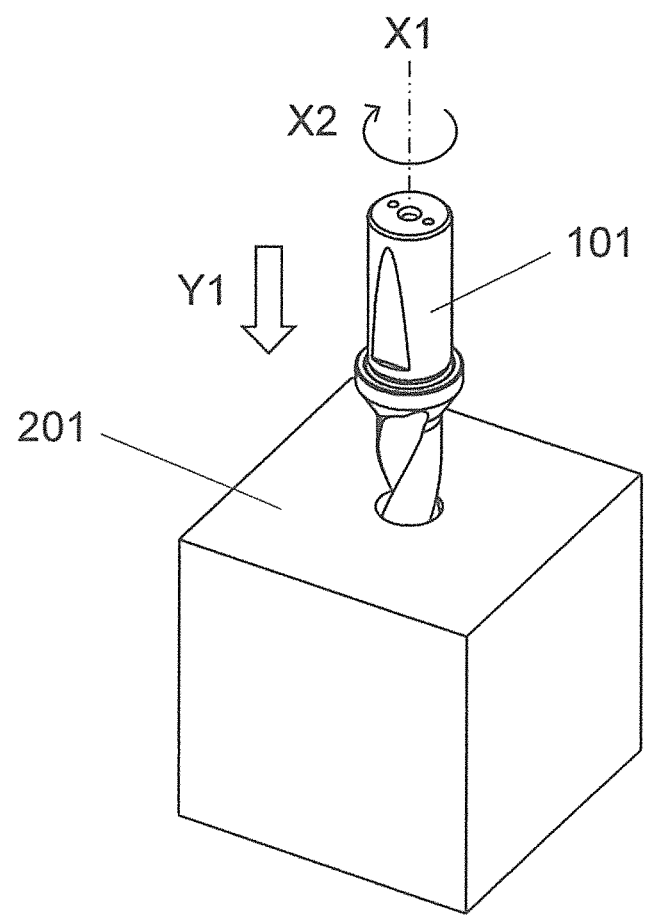
FIG. 15 is a schematic diagram illustrating a step in the method of manufacturing a machined product in the embodiment of the present disclosure.
Figure 16:
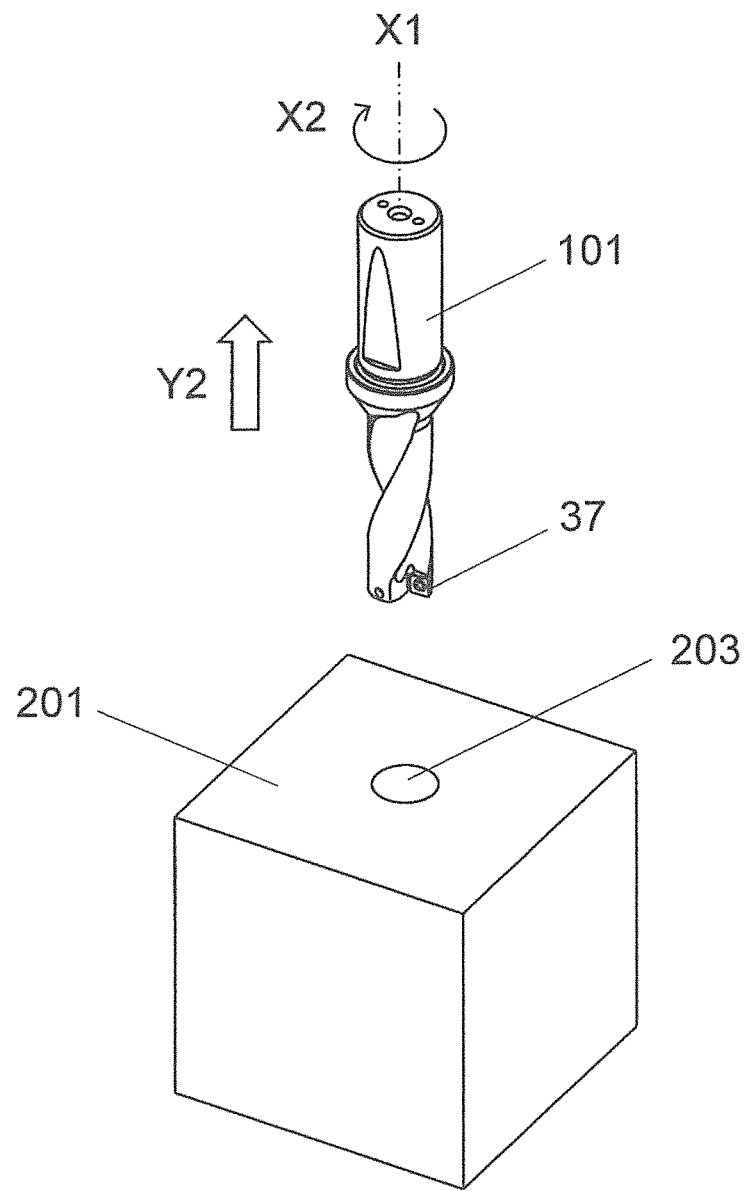
FIG. 16 is a perspective view illustrating a step in the method of manufacturing a machined product in the embodiment of the present disclosure.

More specifically, firstly, the drill 101 is relatively brought near the workpiece 201 by rotating the drill 101 around the rotation axis X1, and by moving the drill 101 in Y1 direction as illustrated in FIG. 14. Subsequently, the workpiece 201 is cut out by bringing the cutting edge 37 in the drill 101 into contact with the workpiece 201 as illustrated in FIG. 15. Thereafter, the drill 101 is relatively moved away from the workpiece 201 by moving the drill 101 in Y2 direction as illustrated in FIG. 16.

The machined product with a machined hole 203 is obtainable through the foregoing steps. With the method of manufacturing a machined product in the present embodiment, the cutting process can be carried out in a stable chip flow state because the method uses the drill 101. It is consequently possible to obtain the machined product with the highly accurate machined hole 203.

In the present embodiment, the workpiece 201 is fixed, and the drill 101 being rotated is brought near the workpiece 201. In FIG. 15, the workpiece 201 is cut out by bringing the cutting edge 37 of the insert being rotated into contact with the workpiece 201. In FIG. 16, the drill 101 being rotated is moved away from the workpiece 201.

During the cutting process with the manufacturing method in the present embodiment, the drill 101 is brought into contact with the workpiece 201, or the drill 101 is moved away from the workpiece 201 by moving the drill 101 in each of the steps. It is, of course, not intended to limit to this embodiment.

For example, in the step (1), the workpiece 201 may be brought near the drill 101. Similarly, in the step (3), the workpiece 201 may be moved away from the drill 101. When the cutting process is continued, it is necessary to repeat the step of bringing the cutting edge 37 of the insert 3 into contact with different portions of the workpiece 201, while keeping the drill 101 rotated.

Examples of the material of the workpiece 201 include aluminum, carbon steel, alloy steel, stainless steel, cast iron, and nonferrous metals.

While the embodiments in the present disclosure have been described and illustrated above, the present disclosure is not limited thereto. It is, of course, possible to make any arbitrary ones insofar as they do not depart from the gist of the present disclosure.

DESCRIPTION OF REFERENCE NUMERALS

101 drill (cutting tool)
1 cutting tool holder (holder)
3 cutting insert (insert)
3*a* first insert (inner cutting edge insert)
3*b* second insert (outer cutting edge insert)
5 main body
51 first end
52 second end
53 outer peripheral surface
5*a* first part
5*b* second part
7 first pocket
9 second pocket
11 mounting surface
13 screw hole
15 screw
17 first groove
19 second groove
21*a* first opening
21*b* second opening
21*c* third opening
21*d* fourth opening
21*b*1 opening end
21*d*1 opening end
23 first region
25 second region
27 third region
29 fourth region
31 first surface
33 second surface
35 through hole
37 cutting edge
39 upper surface
41 lower surface
43 side surface
45 hole part
201 workpiece
203 machined hole

What is claimed is:

1. A cutting tool holder, comprising:
a bar-shaped main body extending from a first end of the bar-shaped main body toward a second end of the bar-shaped main body along a rotation axis, wherein the bar-shaped main body comprises:
an outer peripheral surface,
a first pocket located at the first end and configured to receive a first insert,
a second pocket located at the first end and farther away from the rotation axis than the first pocket, the second pocket configured to receive a second insert,
a first groove spirally extending from the first pocket toward the second end, and
a second groove spirally extending from the second pocket toward the second end;
the first groove, in a cross-section orthogonal to the rotation axis, comprises:
a first opening located on a front side of the first groove in a rotation direction of the rotation axis,
a second opening located on a rear side of the first groove in the rotation direction,
a first region having a concave curvilinear shape, and
a second region being continuous with the first region and extending from the first region as a straight line shape from the first region, on a rear side in the rotation direction;
the second groove, in the cross-section, comprises:
a third opening located on a front side of the second groove in the rotation direction,
a fourth opening located on a rear side of the second groove in the rotation direction,
a third region having a concave curvilinear shape, and
a fourth region located at the fourth opening, the fourth region being continuous with the third region and extending tangentially as a straight line shape from the third region to the outer peripheral surface, on a rear side in the rotation direction; and an angle θ1 formed by the second opening of the first groove and the outer peripheral surface is smaller than an angle θ2 formed by the fourth opening of the second groove and the outer peripheral surface, in the cross-section.

2. The cutting tool holder according to claim 1, wherein the second region is located at the second opening.

3. The cutting tool holder according to claim 1, wherein the second region is longer than the fourth region in the cross-section.

4. The cutting tool holder according to claim 1, wherein a curvature radius of the first region is smaller than a curvature radius of the third region in the cross-section.

5. The cutting tool holder according to claim 1, wherein the first opening comprises a first surface having a straight line shape being continuous with the outer peripheral surface of the main body in the cross-section.

6. The cutting tool holder according to claim 5, wherein an angle θ3 formed by the first surface and the outer peripheral surface of the main body is an obtuse angle in the cross-section.

7. The cutting tool holder according to claim 5, wherein the third opening comprises a second surface having a straight line shape being continuous with the outer peripheral surface of the main body in the cross-section.

8. The cutting tool holder according to claim 7, wherein an angle θ4 formed by the second surface and the outer peripheral surface of the main body is an obtuse angle in the cross-section.

9. A cutting tool, comprising:
the cutting tool holder according to claim 1;
a first insert attached to the first pocket in the cutting tool holder; and
a second insert attached to the second pocket in the cutting tool holder.

10. A method of manufacturing a machined product, comprising:
rotating the cutting tool according to claim 9 on the rotation axis;
bringing the cutting tool being rotated into contact with a workpiece; and
moving the cutting tool away from the workpiece.

11. The cutting tool holder according to claim 1, wherein a depth of the first groove is greater than a depth of the second groove.

12. The cutting tool holder according to claim 11, wherein the depth of the first groove is in a range of 15-40 percent of an outer diameter of the first end.

13. The cutting tool holder according to claim 11, wherein the depth of the second groove is in a range of 10-35 percent of an outer diameter of the first end.

14. A cutting tool holder, comprising:
a bar-shaped main body extending from a first end of the bar-shaped main body toward a second end of the bar-shaped main body along a rotation axis, wherein
the bar-shaped main body comprises:
an outer peripheral surface,
a first pocket located at the first end and configured to receive a first insert,
a second pocket located at the first end and farther away from the rotation axis than the first pocket, the second pocket configured to receive a second insert,
a first groove spirally extending from the first pocket toward the second end, the first groove beginning at a point located closer to the second end than the first pocket, and
a second groove spirally extending from the second pocket toward the second end, the second groove beginning at a point located closer to the second end than the second pocket;
the first groove, in a cross-section orthogonal to the rotation axis, comprises:
a first opening located on a front side of the first groove in a rotation direction of the rotation axis,
a second opening located on a rear side of the first groove in the rotation direction,
a first region having a concave curvilinear shape, and
a second region being continuous with the first region and extending from the first region as a straight line shape from the first region, on a rear side in the rotation direction;
the second groove, in the cross-section, comprises:
a third opening located on a front side of the second groove in the rotation direction,
a fourth opening located on a rear side of the second groove in the rotation direction,
a third region having a concave curvilinear shape, and
a fourth region located at the fourth opening, the fourth region being continuous with the third region and extending tangentially as a straight line shape from the third region to the outer peripheral surface, on a rear side in the rotation direction; and
an angle θ1 formed by the second opening of the first groove and the outer peripheral surface is smaller than an angle θ2 formed by the fourth opening of the second groove and the outer peripheral surface, in the cross-section.

* * * * *